US012408258B2

(12) United States Patent
Zhou et al.

(10) Patent No.: US 12,408,258 B2
(45) Date of Patent: Sep. 2, 2025

(54) HOT CATHODE FOR AN ION SOURCE OF A NEUTRON GENERATOR

(71) Applicant: Halliburton Energy Services, Inc., Houston, TX (US)

(72) Inventors: Zilu Zhou, Needham, MA (US); Weijun Guo, Houston, TX (US); Lesley Allison Fessler, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 284 days.

(21) Appl. No.: 18/144,500

(22) Filed: May 8, 2023

(65) Prior Publication Data

US 2024/0381521 A1 Nov. 14, 2024

(51) Int. Cl.
*H05H 3/06* (2006.01)

(52) U.S. Cl.
CPC .................................... *H05H 3/06* (2013.01)

(58) Field of Classification Search
CPC .. H05H 3/06; H05H 6/00; G01V 5/105; H01J 35/045; H01J 35/04; H01J 2235/081; H01J 2235/06
See application file for complete search history.

(56) References Cited

U.S. PATENT DOCUMENTS

| | | | | |
|---|---|---|---|---|
| 4,075,526 | A | 2/1978 | Grubis | |
| 5,293,410 | A | 3/1994 | Chen et al. | |
| 9,322,262 | B2 | 4/2016 | Chirovsky et al. | |
| 10,502,861 | B2 | 12/2019 | Navarro-Sorroche et al. | |
| 2002/0166975 | A1* | 11/2002 | Reyes | H01J 37/08 250/423 R |
| 2009/0146052 | A1* | 6/2009 | Groves | H05H 3/06 250/269.4 |
| 2011/0249801 | A1 | 10/2011 | Firestone et al. | |
| 2013/0180780 | A1 | 7/2013 | Chirovsky et al. | |
| 2014/0086376 | A1* | 3/2014 | Perkins | H05H 3/06 376/114 |
| 2018/0090297 | A1* | 3/2018 | Holden | H01J 37/08 |

(Continued)

FOREIGN PATENT DOCUMENTS

EP 1100110 B1 11/2004

OTHER PUBLICATIONS

International Search Report & Written Opinion; PCT Application No. PCT/US2023/021533; mailed Jan. 25, 2024.

(Continued)

*Primary Examiner* — David P Porta
*Assistant Examiner* — Mamadou Faye
(74) *Attorney, Agent, or Firm* — NOVAK DRUCE CARROLL LLP

(57) ABSTRACT

Systems and methods are provided for operating and constructing a neutron generator. In some examples, an ion source within a neutron generator may include a hot cathode; at least one cylindrical sleeve coupled to an exterior surface of the hot cathode; at least one electrode coupled to an interior surface of the neutron generator; and at least one mounting flange, wherein a proximal end of the at least one mounting flange is coupled to the at least one cylindrical sleeve and a distal end of the at least one mounting flange is coupled to the at least one electrode.

18 Claims, 10 Drawing Sheets

(56) References Cited

U.S. PATENT DOCUMENTS

2019/0304736 A1 10/2019 Matsuura et al.

OTHER PUBLICATIONS

Abstract of Ellis, Darwin et al., "Well Logging for Earth Scientists", Springer Science & Business Media, Jun. 29, 2007—Science—708 pages.

Abstract of Csikai, G J., "CRC handbook of fast neutron generators", United States: N. p., Jan. 1, 1987.

Abstract of Reifenschweiler, O., "Sealed-Off Neutron Tube: the Underlying Research Work", Journal Philips Res. Rept., vol. 16; Oct. 1, 1961.

Schlumberger; Litho Scanner, High-definition spectroscopy service brochure; retrieved from https://www.slb.com/-/media/files/fe/brochure/litho-scanner-br.ashx on May 8, 2023.

Schlumberger; Pulsar Multifunction spectroscopy service brochure; retrieved from https://www.slb.com/-/media/files/fe/brochure/pulsar-spectroscopy-br.ashx on May 8, 2023.

Halliburton; RMT-3D™ Reservoir Monitor Tool for Oil, Water, and Gas Saturation; retrieved from https://www.halliburton.com/en/products/reservoir-monitor-tool-3-detector on May 8, 2023.

Abstract of Chen, Jianxing et al., "A new Cased-Hole 2⅛-in. Multi-Detector Pulsed-Neutron Tool: Theory and Characterization", Paper presented at the SPWLA 56th Annual Logging Symposium, Long Beach, California, USA, Jul. 2015; SPWLA-2015-AAA; Jul. 18, 2015.

Mott, N.F.,"The Theory Of Atomic Collisions", Digital Library of India Item 2015.3748; 1949.

Kim, Y.K et al., "Electron-Impact Cross Sections for Ionization and Excitation Database", DOI: https://dx.doi.org/10.18434/T4KK5C ; NIST: Physical Measurement Laboratory; retrieved from https://www.nist.gov//pml/electron-impact-cross-sections-ionization-and-excitation-database on May 8, 2023.

* cited by examiner

700

HOT CATHODE FOR AN ION SOURCE OF A NEUTRON GENERATOR

TECHNICAL FIELD

The present disclosure relates generally to wellbore operations and, more specifically (although not necessarily exclusively), to a hot cathode for an ion source of a neutron generator the is operable in a wellbore environment.

BACKGROUND

Wells can be drilled to access and produce hydrocarbons such as oil and gas from subterranean geological formations. Wellbore operations can include drilling operations, completion operations, fracturing operations, and production operations. Drilling operations may involve gathering information related to downhole geological formations of the wellbore. The information may be collected by wireline logging, logging while drilling (LWD), measurement while drilling (MWD), drill pipe conveyed logging, or coil tubing conveyed logging.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
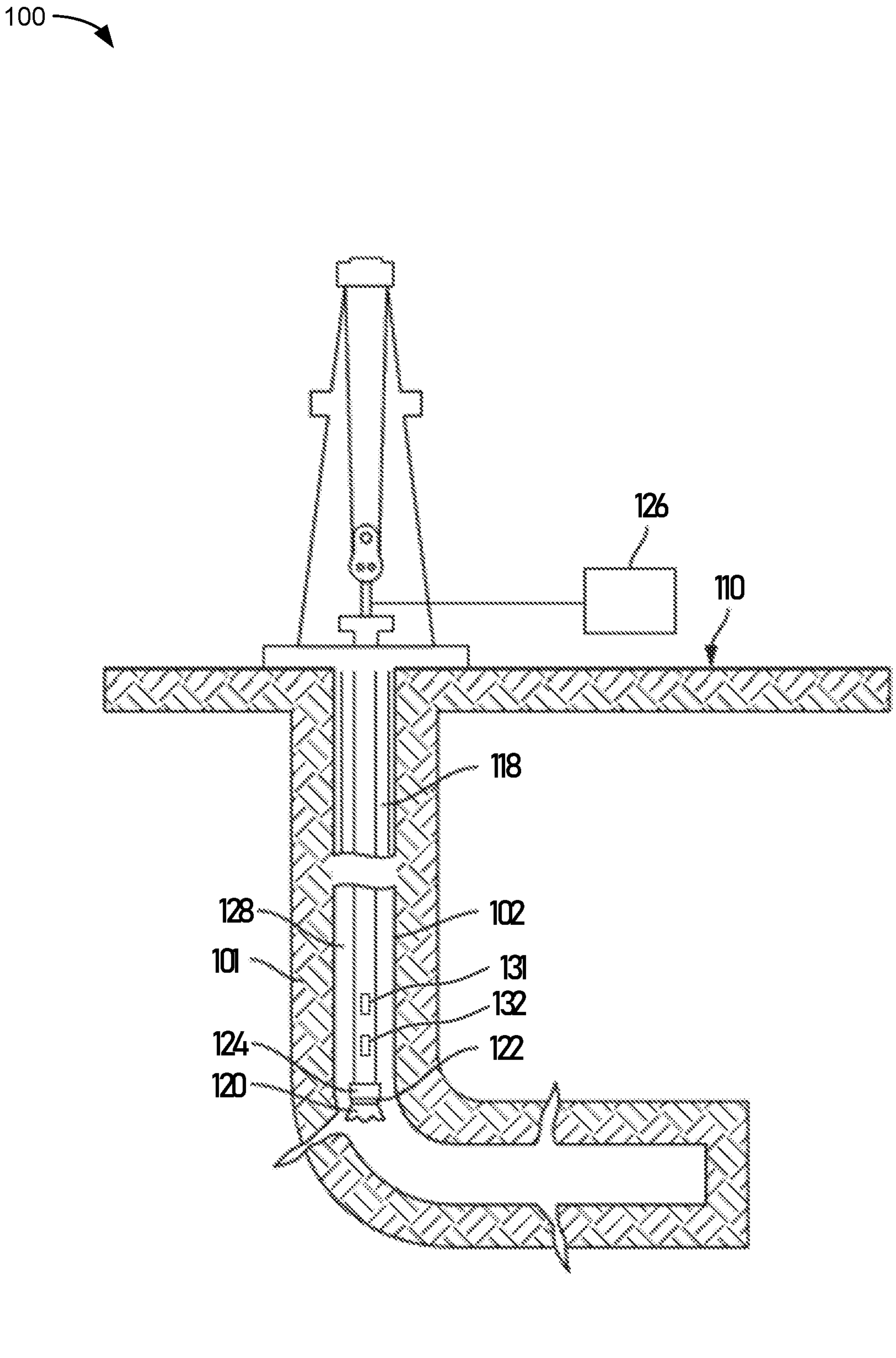
FIG. 1 is a diagram of a wellbore system with a logging tool having an ion source for a neutron generator, in accordance with aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As discussed previously, wellbore drilling and/or operation can involve gathering information related to downhole geological formations of the wellbore. In some cases, a compact deuterium (D) and tritium (T) neutron generator can be used in a downhole nuclear logging tool for oil and gas well measurements. The neutron generator can include a sealed tube as vacuum housing, a gas reservoir for storing D/T gas, an ion source for generating ions that are accelerated by a high voltage system, and a target for facilitating the DT fusion reactions to generate neutrons.

Many neutron generating tubes are based on hot-cathode ion source technology, in which a dispenser (hot cathode) is introduced to emit electrons for direct ionization of gas molecules to produce the D/T ions. In some cases, ions can be continuously extracted in a continuous wave (CW) or a pulsed mode, and the ions can be accelerated to bombard a target that contains D/T molecules which is powered at a high voltage (e.g., 100 kV).

However, there are challenges associated with constructing and operating a hot cathode ion source for a neutron generating tube. For example, complex tube structure and compact geometry can make the hot cathode installation difficult and tedious. In some aspects, the tube structure with housing and electrodes may be brazed together in a high temperature environment, such that the hot-cathode and/or other delicate components can only be mounted after the brazing process. In some cases, an extended installation procedure can be problematic because the cathode surface may absorb moisture if it is exposed to air for an extended period of time, which can degrade its performance. Further, the performance of the neutron generator can be affected if the position of the hot cathode is incorrect or misaligned. In addition, it is important to minimize thermal losses during operation of the hot cathode in order to increase efficiency and performance.

The disclosed technology addresses the foregoing by providing systems and techniques for implementing a hot cathode for use in an ion source of a neutron generator. For example, according to aspects of the present technology, a hot cathode can include one or more cylindrical sleeves that can be used for mounting the hot cathode within a neutron generator. In some cases, the cylindrical sleeves may include a thermal shield sleeve that can help minimize thermal losses.

In some aspects, the hot cathode assembly disclosed herein can include a mounting flange that can be coupled to an electrode within the neutron generator in a manner that can precisely control the distance between the hot cathode and a corresponding grid. In some instances, the mounting flange can be centralized (e.g., within the tube) by a curb structure on the hot cathode electrode in the tube to enhance positional accuracy.

In some instances, the hot cathode assembly disclosed herein can include an electrical field (e-field) shaping structure that is disposed on the hot cathode electrode (e.g., directed toward the corresponding grid). In some examples, the hot cathode assembly disclosed herein can include through holes to facilitate vacuum connectivity.

FIG. 1 is a diagram of a wellbore system 100 with a logging tool having an ion source that includes a hot cathode and is used for a neutron generator, according to some aspects of the present disclosure. In some cases, the wellbore system 100 may include a well, such as an oil or gas well, for extracting fluids from a subterranean formation 101. In some examples, the wellbore system 100 may be used to create a wellbore 102 from a surface 110 of the subterranean formation 101. In some aspects, the wellbore system 100 can include a well tool or downhole tool 118 and a drill bit 120. In some configurations, the downhole tool 118 can be any tool used to gather information about the wellbore 102. For example, the downhole tool 118 can be a tool delivered downhole by wireline, often referred to as wireline formation testing ("WFT"). In another example, the downhole tool 118 can be a tool for measuring-while-drilling, for measuring while wireline logging, and/or for measuring while logging-while-drilling.

In some aspects, the downhole tool 118 can include a neutron generator 131 and one or more measurement devices such as measurement device 132 that may be used for determining information about the formation 101 through the wellbore 102. For example, neutron generator 131 and/or measurement device 132 can be used to determine formation porosity, hydrogen index, sigma, density, elemental weight percentages, rock types, fluidic types (e.g., gas, oil, or water), and/or fluidic information in the wellbore 102.

In some aspects, the downhole tool 118 can include an additional sensor component 122 for determining information about the wellbore 102. Examples of information can include monitoring of drilling rate of penetration, weight on bit, standpipe pressure, depth, mud flow in, rotations per minute, torque, equivalent circulation density, or other parameters. In some instances, the downhole tool 118 can also include a transmitter 124 for transmitting data from the sensor component 122 to the surface 110. In some cases, the downhole tool 118 can include the drill bit 120 for drilling the wellbore 102.

In some examples, the wellbore 102 can be drilled from the surface 110 and through the subterranean formation 101. In some aspects, drilling fluid can be pumped through the drill bit 120 and into the wellbore 102 to enhance drilling operations (e.g., as the wellbore 102 is drilled). In some cases, the drilling fluid can circulate back toward the surface 110 through a wellbore annulus 128.

In some cases, wellbore system 100 can also include a computing device 126. In some examples, the computing device 126 can be communicatively coupled to the downhole tool 118 and receive data about the drilling or logging process. In some instances, the computing device 126 can process and display the data to a user. In some aspects, the computing device 126 include one or more of the components as illustrated in computing device architecture 900.

In some aspects, a compact deuterium (D) and tritium (T) neutron generator can be used in a downhole nuclear logging tool for oil or gas well measurements. For instance, the neutron generator can include a sealed tube as vacuum housing, a gas reservoir for storing gas (e.g., D-T gas), an ion source for generating ions that are accelerated by a high voltage system, and a target for facilitating the D-T fusion reactions to generate neutrons.

Figure 2:
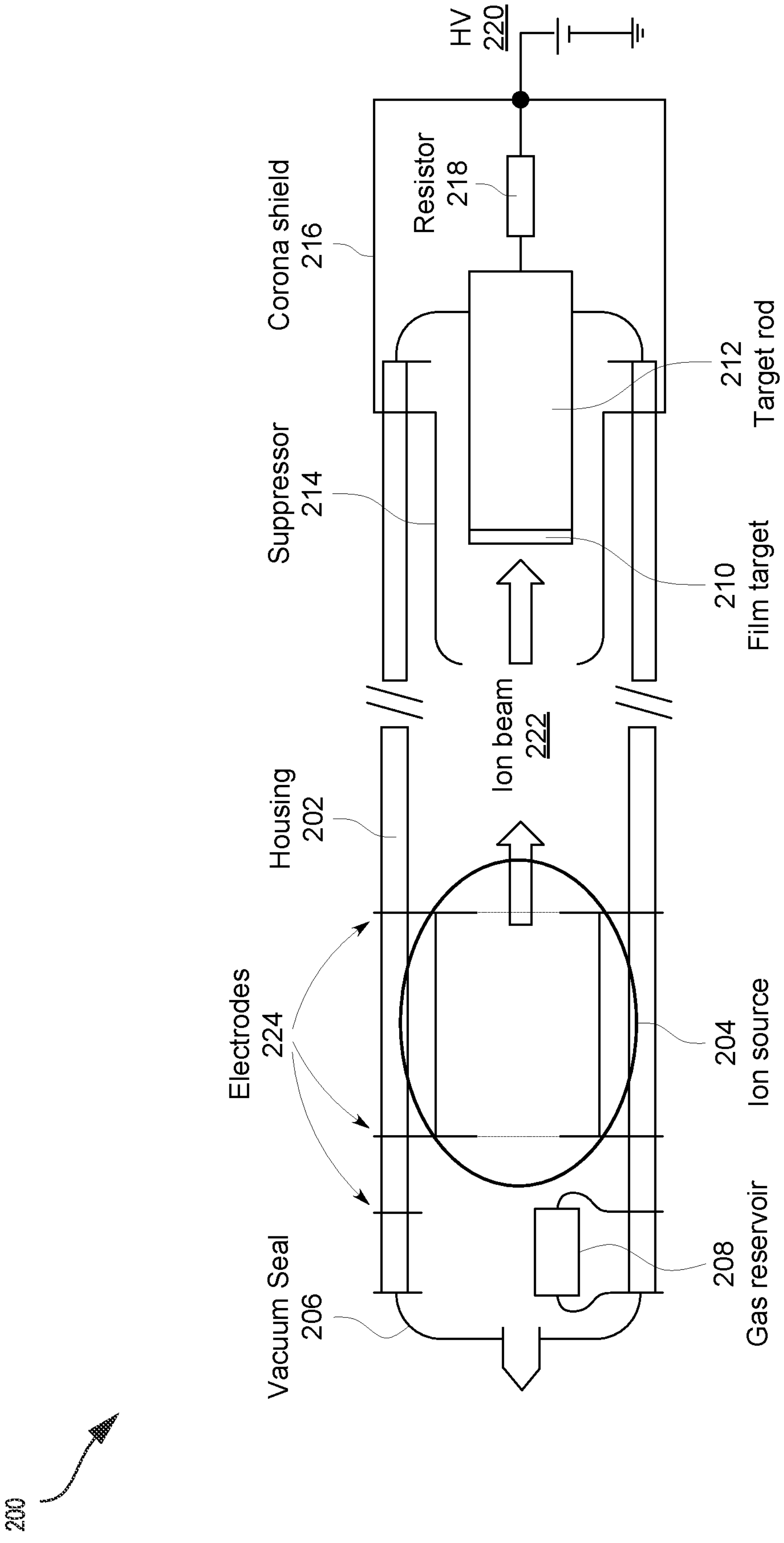
FIG. 2 is a diagram of a neutron generator that includes an ion source and a target, in accordance with aspects of the present disclosure.

FIG. 2 is a diagram of a neutron generator 200 that includes an ion source 204 and a target (e.g., film target 210 and target rod 212), in accordance with aspects of the present disclosure. In some cases, neutron generator 200 can include a housing 202 that can be used to form a sealed tube. In some examples, the housing 202 of neutron generator 200 can include one or more ceramic housing rings (e.g., used as insulating spacers) and one or more metal washers (e.g., used as electrodes 224) in a brazed stack.

In some aspects, neutron generator 200 can be filled with a mixture of $D_2$ and $T_2$ gas, with can be stored in gas reservoir 208. In some cases, neutron generator 200 can include ion source 204 that can use the gas stored in gas reservoir 208 to generate ion beam 222 (further details regarding ion source 204 are discussed below). In some examples, ion beam 222 can be directed at a target that can include film target 210 and target rod 212. In some cases, film target 210 can be coated onto or otherwise attached to target rod 212. In some cases, target rod 212 can be made of copper and may be used as a backing structure. In some configurations, film target 210 can include a Titanium layer that is saturated with the D-T gas (e.g., same gas stored in gas reservoir 208).

In some instances, the target rod 212 can act as an electrical connector to a high voltage (HV) source 220 and a thermal conductor to transfer heat away from the target. That is, D and T atomic and molecular ions can be generated by the ion source 204 and can be accelerated to bombard the film target 210, which is loaded with the same gas. In some aspects, the D-T, or T-D fusion reactions can occur at a high voltage (e.g., supplied by HV source 220) in order to generate neutrons.

In some cases, neutron generator 200 may also include a resistor 218 that can be connected between the target rod 212 and the HV source 220. In some aspects, the HV source 220 may be coupled to a corona shield 216 that can connect to a suppressor 214. For example, corona shield 216 can be coupled outside of housing 202 and provide a connection to suppressor 214. In some configurations, the suppressor 214 can be configured to reject or suppress low-energy, secondary emission electrons emitted from film target 210 during ion beam 222 bombardment. In further examples, the suppressor 214 can trap ions that reflect or scatter from film target 210 (e.g., backscattered ions). That is, the suppressor 214 may surround or enclose film target 210 and a portion of target rod 212 to trap backscattered ions and to suppress secondary emission electrons within the housing 202 of neutron generator 200.

In some examples, neutron generator 200 can include a vacuum seal 206 (e.g., an end cap structure) that can be used to seal the vacuum enclosure. In some cases, the vacuum seal 206 may include a tubing structure (e.g., copper tubing) that can be connected to a vacuum pumping and gas handling system for neutron tube processing. In some aspects, the tubing structure that is part of vacuum seal 206 can be used to load gas into gas reservoir 208. In some cases, the vacuum seal 206 can be used to shut off the connection to the gas handling system once the required among of gas has been loaded into gas reservoir 208.

Figure 3:
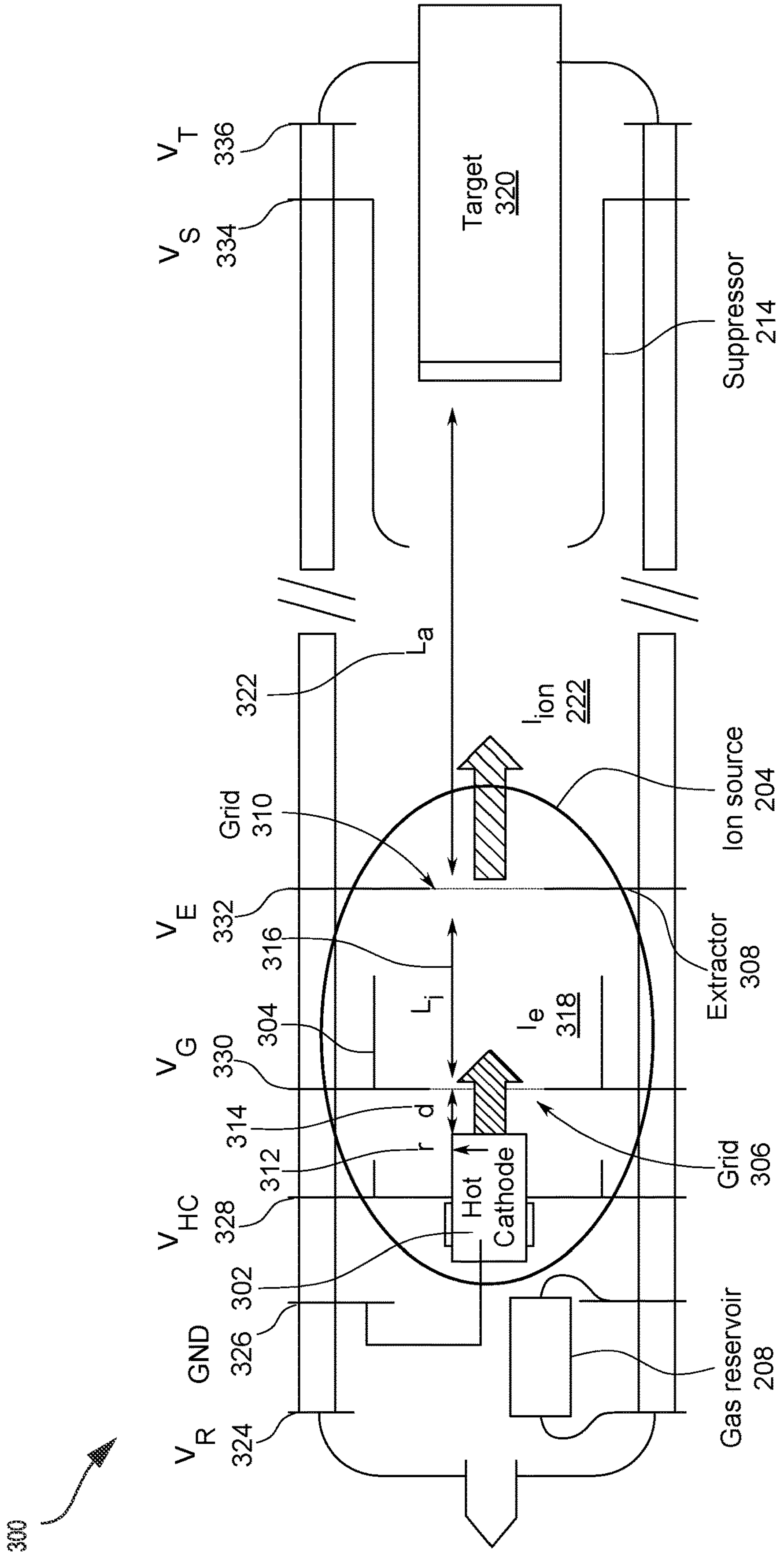
FIG. 3 is diagram of a neutron generator that includes an ion source with a hot cathode and a target, in accordance with aspects of the present disclosure.

FIG. 3 is a diagram of a neutron generator 300 that includes an ion source 204, a gas reservoir 208, and a target 320, in accordance with aspects of the present disclosure. In some instances, one or more of the components within neutron generator 300 may be coupled to one or more electrodes (e.g., electrodes 224) that can be configured to provide biasing. For example, gas reservoir 208 may be coupled to an electrode corresponding to a gas reservoir voltage $V_R$ 324 and to an electrode that provides grounding (e.g., GND 326).

In some cases, the target 320 may include a film target (e.g., film target 210) and a target rod (e.g., target rod 212). In some examples, the ion source 204 may include a hot cathode 302. In some configurations, hot cathode 302 may have a cylindrical form with a radius that is represented by r 312. In some configurations, hot cathode 302 may be coupled an electrode corresponding to a hot cathode voltage $V_{HC}$ 328 and to an electrode corresponding to ground (e.g., GND 326). In some aspects, hot cathode 302 can be used to emit electrons (e.g., $I_e$ 318) for direct ionization of gas molecules to produce D/T ions. In some configurations, ion beam 222 from the ion source 204 can be switched on/off by controlling the electron mission from the hot cathode 302 to stop ionization and by controlling the ion beam extraction inside the ion source 204.

In some examples, ion source 204 may include an ion source cylinder 304 that is associated with a first grid 306. In some aspects, the first grid 306 may be coupled to an electrode that is configured to provide a grid voltage $V_G$ 330. As illustrated, the distance d 314 represents the distance between the surface of the hot cathode 302 and the first grid 306. In some configurations, the ion source 204 may also include an extractor 308 with a second grid 310 that can be configured to extract the ion beam 222 from the ion source 204. In some examples, the second grid may be coupled to an electrode that is configured to provide an extractor voltage $V_E$ 332. As illustrated, the length $L_i$ 316 is a length between the first grid 306 and the extractor 308 (e.g., the second grid 310) in the region of the ion source cylinder 304, and the length $L_a$ 322 is a length between the extractor 308 (e.g., the second grid 310) and the target 320 in the acceleration volume. In some aspects, high voltages can be applied to the suppressor 214 (e.g., electrode corresponding to $V_S$ 334) and target 320 (e.g., electrode corresponding to $V_T$ 336) for accelerating the ion beam 222 to bombard the target 320.

In some aspects, hot cathode emission may be governed by the Child Law (or the Child-Langmuir Law or three-halves-power law). That is, the maximum space-charge-limited current in a planar diode structure can be a function of the distance and potential difference between the hot cathode 302 and the first grid 306, provided that the hot cathode 302 is sufficiently heated such that sufficient electron charges hover near its surface space. In some cases, applying a given potential difference between the hot cathode 302 and the first grid 306 can cause the electron beam 318 to be extracted and shot, passing through the first grid 306. In some cases, the first grid 306 can have a transparency that is approximately 90-100%. In some aspects, the electron current Ie can be represented as follows:

$$I_e = K\frac{V_g^{3/2}}{d^2}A = K\frac{V_g^{3/2}}{d^2}\pi r^2 \quad (1)$$

In equation (1), $I_e$ can correspond to the electron current (mA); $V_g$ can correspond to the voltage difference between cathode and grid (V); d can correspond to the distance between cathode and grid (mm); and A can correspond to the surface area of cathode with a radius of r (e.g., surface area may be measured in mm2). In some cases, for electrons, k=0.002334 mA V-3/2.

FIGS. 2 and 3 illustrate neutron generators having a tube-like geometry, in which the hot cathode 302 is mounted and positioned next to the first grid 306 structure. As noted above, the radius of the hot cathode 302 surface is r 312, the distance from the hot cathode 302 to the first grid 306 is d 314, and the bias voltage on the first grid 306 is $V_G$. In some aspects, hot cathode 302 can have a geometry similar to a tube-like structure. In one illustrative example, hot cathode 302 can have a radius r=2 mm and the distance from the hot cathode 302 to the first grid 306 can be approximately d=1.0-1.5 mm. In some instances, equation (1) can be used to plot the electron current as a function of the bias voltage applied on the first grid 306.

In some cases, the hot cathode 302 can send an electron beam 318 to ionize hydrogen or hydrogen isotope (D/T) gas at a given pressure in the region of the ion source cylinder 304. In some aspects, the ionized gas can be extracted (e.g., by the extractor 308) in the form of an ion beam 222. For hydrogen and hydrogen isotope molecular ionization, cross sections can be functions of electron impact energy in a range from 0 eV to a few keV. In some examples, an electron energy range of interest can be from 80 eV to 200 eV, while the cross sections can be in the range of 0.7 and 1.0 $A^2$ (an average of 0.85 $A^2$), which may be equivalent to about one Bohr radius in size.

In some configurations, assuming a close to 100% ion extraction efficiency, the ion beam 222 current extracted can be expressed in the following equation:

$$I_I = I_e n_{DT} L_I \sigma \quad (2)$$

In equation (2), $I_I$ can correspond to the ion current of the ion beam 222; $I_e$ can correspond to the electron current of the electron beam 318 from the hot cathode 302 (e.g., 50 mA); $L_I$ can correspond to a length $L_i$ 316 between the first grid 306 and the extractor 308 in the region of the ion source cylinder 304 (e.g., 1.0 cm); σ can correspond to the hydrogen molecular ionization cross section at a given electron energy (e.g., between 80-100 eV); and $n_{DT}$ can correspond to the D-T molecular gas pressure in the region of the ion source cylinder 304 at a given heating power on the gas reservoir 208 (e.g., 1.0 mTorr).

In one illustrative example that assumes the above operating parameters (e.g., 1.0 mTorr and 50 mA in a 1.0 cm geometry and assuming ~100% efficiency for ion extraction), 150 μA ion current can pass therethrough. Both transparencies of the first grid 306 and the second grid 310 on the extractor 308 can reduce the final ion beam 222 current. In some cases, the gas pressure can be adjusted (e.g., increased) to compensate for ion losses.

In some examples, the gas reservoir 208 can be heated to generate 1.0 mTorr or higher gas pressure. The hot cathode 302 is heated sufficiently so that a sufficient number of electron charges hover near its surface space. By applying a voltage (e.g., $V_G$) on the first grid 306 in a range of 200-250 V, ion source 204 can generate an electron beam 318 with a current of 40-50 mA shooting into the region of the ion source cylinder 304. With approximately 100-150 V in the middle region of the ion source cylinder 304, the electrons will be deaccelerated for ionization with the highest cross-section to produce more ions. In some cases, ions can be extracted with the extractor 308 when a voltage is applied between 0 to −50 V.

According to some examples, the ion source 204 can be based on electron-impact direct ionization. That is, in some instances, a plasma formation in the region of the ion source cylinder 304 may not be needed. Thus, the ion beam 222 may be pulsed at a relatively fast rate, with the pulse rise and fall times being in a range of 100-500 nsec. In some instances, the structure of the ion source 204 can have a small capacitance and impedance (no magnetic field) and the control voltages can be applied with values less than or equal to 300 V.

According to some aspects, the capability of fast pulsing can make the neutron generator 300 useful for a variety of downhole measurements including fast neutron C/O—ratio of carbon and oxygen, and thermal neutron capture elemental analysis. Because of direct electron-impact ionization, the neutron generator 300 gas pressure can be a "free parameter" that can be used for adjusting the current of the ion beam 222, along with the hot cathode 302 electron beam 318 emission. Thus, in a pulsed operation mode, the ion beam 222 current can be adjusted high, reversely proportional to the duty factor, to maintain a constant average ion beam current as if in a CW—continuous wave mode. The low gas pressure in the ion source 204, combining with no real plasma formation, makes the pulsed operation much easy in control.

Figure 4A:
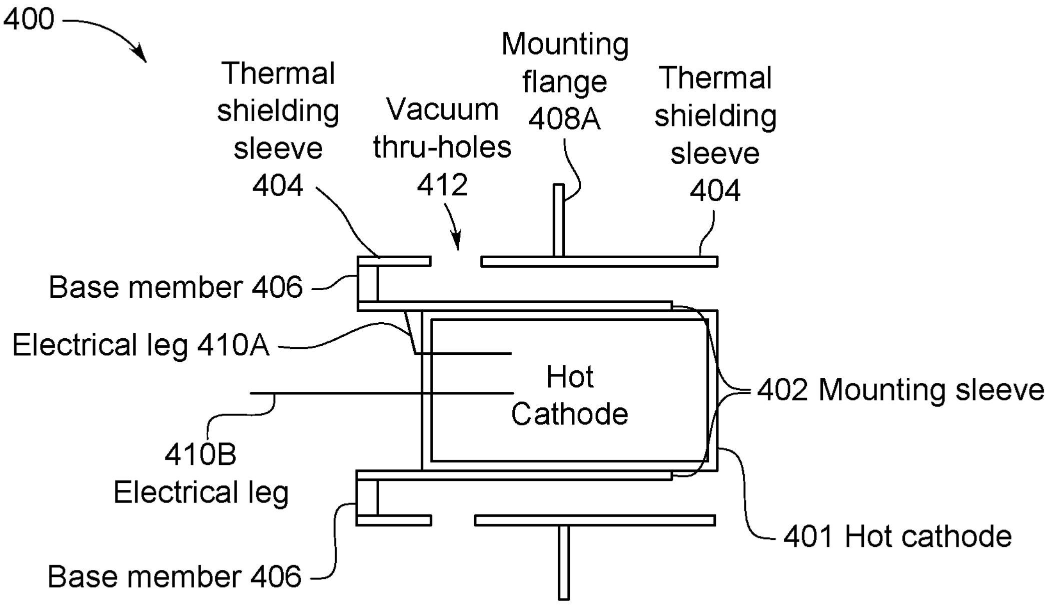
FIG. 4A is a diagram of a hot cathode assembly for use in an ion source of a neutron generator, in accordance with aspects of the present disclosure.

FIG. 4A is a diagram of a hot cathode assembly 400 for use in an ion source of a neutron generator (e.g., ion source 204 of neutron generator 300), in accordance with aspects of the present disclosure. In some cases, hot cathode assembly 400 can include hot cathode 401. In some examples, hot cathode 401 can have a cylindrical shape. In some cases, the body of hot cathode 401 may include molybdenum-rhenium (MoRe). In some aspects, a first cylindrical sleeve such as mounting sleeve 402 can be coupled to hot cathode 401. For instance, mounting sleeve 402 can be coupled to hot cathode 401 by welding, using an adhesive, using a mechanical component such as a clip or fastener, etc. In some cases, mounting sleeve 402 may be formed together with the hot cathode 401.

In some configurations, a second cylindrical sleeve such as thermal shielding sleeve 404 can be attached to mounting sleeve 402. That is, the thermal shielding sleeve 404 may have a larger diameter than the mounting sleeve 402 to form a concentric configuration. In some instances, the thermal shielding sleeve 404 may be coupled to the mounting sleeve 402 using base member 406. In some aspects, base member 406 may include a Kovar material, a Monel material, any other material suitable for coupling the cylindrical sleeves, and/or any combination thereof.

In some examples, the mounting sleeve 402, the thermal shielding sleeve 404, and/or the base member 406 may be formed as part of a single case or housing. In further examples, one or more of the components illustrated (e.g., mounting sleeve 402, thermal shielding sleeve 404, base member 406, etc.) may be coupled to hot cathode 401 as part of a manufacturing process and/or in a post-manufacturing assembly process.

In some cases, thermal shielding sleeve 404 may include one or more openings such as vacuum through-holes 412. In some examples, hot cathode 401 may include one or more electrical contacts that can be used to provide biasing voltage(s) and/or grounding for hot cathode 401. For example, hot cathode 401 can include electrical leg 410A and electrical leg 410B. In some configurations, electrical leg 410A can be coupled (e.g., through a spot weld) to mounting sleeve 402. That is, electrical leg 410A can receive an electrical signal by way of mounting sleeve 402, which can be coupled to an electrode within a neutron generator via thermal shielding sleeve 404 and mounting flange 408A. In some examples, electrical leg 410B may also be coupled to another electrode within a neutron generator (e.g., see FIG. 3).

In some aspects, mounting flange 408A can be attached to an outer sleeve (e.g., thermal shielding sleeve 404). In some cases, mounting flange 408A can be used to mount the hot cathode assembly 400 to the $V_{HC}$ electrode within a neutron generator. In some examples, the location that the mounting flange 408A attaches to thermal shielding sleeve 404 can be used to determine the position of the hot cathode assembly 400 within the neutron generator. For example, as illustrated in FIG. 4A, mounting flange 408A is attached to thermal shielding sleeve 404 at an intermediate location that substantially coincides with the middle of the body of hot cathode 401, which can cause the body of hot cathode 401 to protrude past the mounting flange 408A and the $V_{HC}$ electrode (see FIG. 5A). That is, the body of hot cathode 401 can extend past the $V_{HC}$ electrode by a distance that is based on the distance between the edge of the thermal shielding sleeve 404 and the connection point with mounting flange 408A.

Figure 4B:
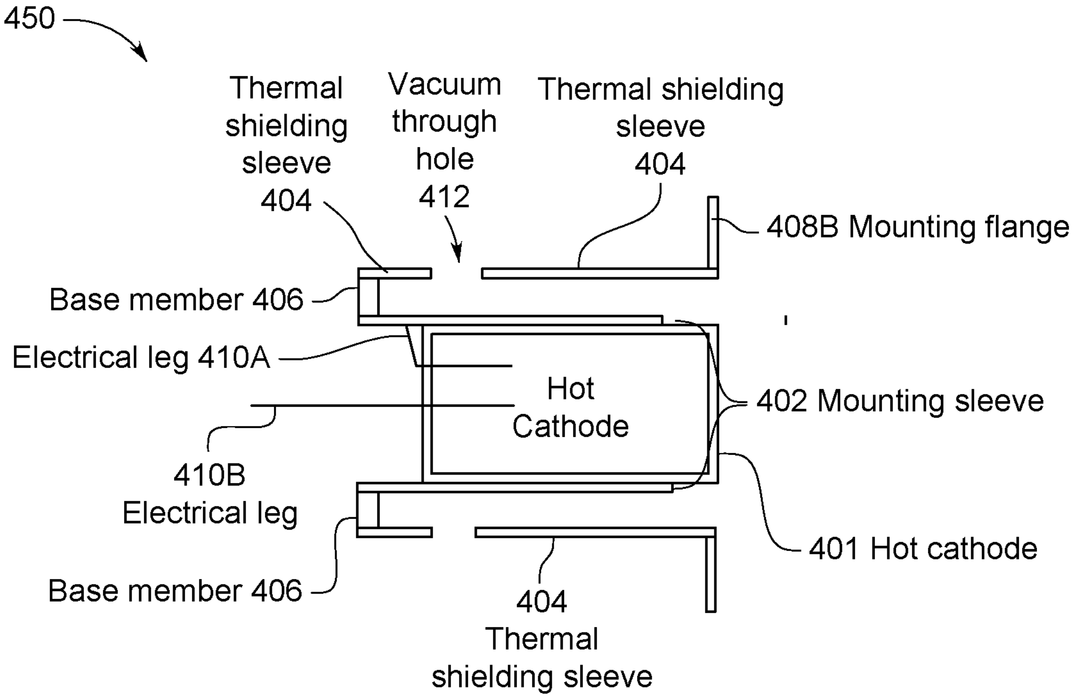
FIG. 4B is another diagram of a hot cathode assembly for use in an ion source of a neutron generator, in accordance with aspects of the present disclosure.

FIG. 4B is a diagram of a hot cathode assembly 450 for use in an ion source of a neutron generator (e.g., ion source 204 of neutron generator 300), in accordance with aspects of the present disclosure. In some cases, hot cathode assembly 450 is similar to hot cathode assembly 400. That is, hot cathode assembly 450 includes a hot cathode 401, mounting sleeve 402, thermal shielding sleeve 404, base member 406, electrical leg 410A, electrical leg 410B, and/or vacuum through-holes 412.

In some aspects, hot cathode assembly 450 may include mounting flange 408B. As noted above with respect to mounting flange 408A, the location that the mounting flange 408B attaches to thermal shielding sleeve 404 can be used to determine the position of the hot cathode assembly 450 within the neutron generator. As illustrated in FIG. 4B, mounting flange 408B is attached to thermal shielding sleeve 404 at or near the end (e.g., edge) of the thermal shielding sleeve 404, which can cause the body of hot cathode 401 to be aligned with the $V_{HC}$ electrode (see FIG. 5B).

Figure 5A:
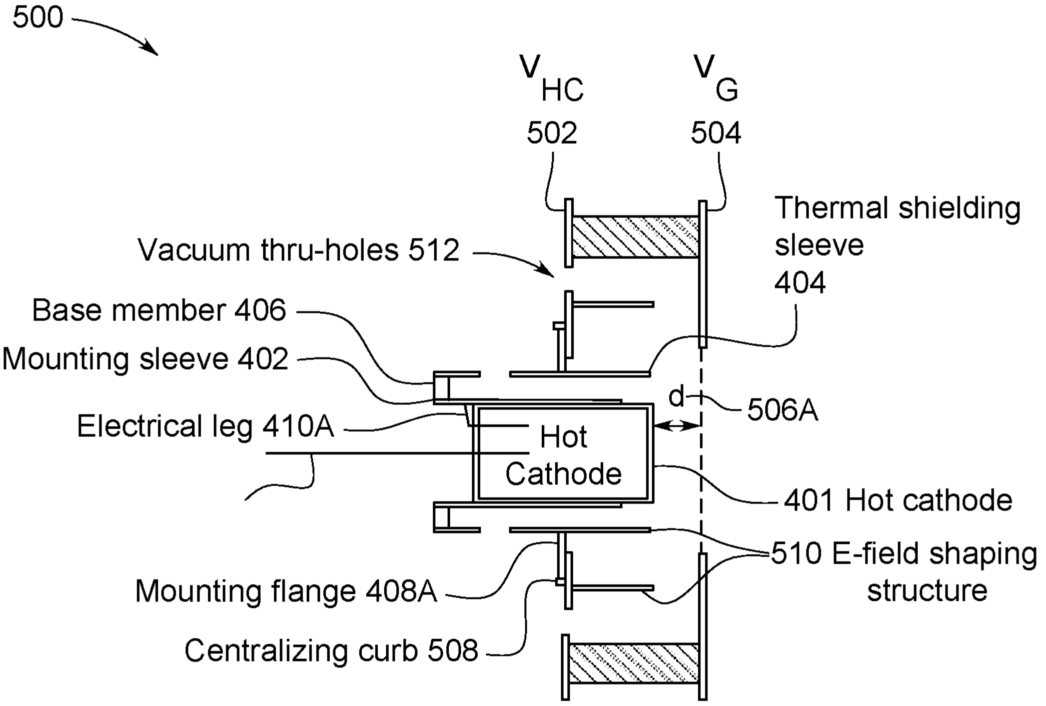
FIG. 5A is a diagram of a hot cathode assembly configured within an ion source, in accordance with aspects of the present disclosure.

FIG. 5A is a diagram of a system 500 that includes a hot cathode assembly 400 configured within an ion source, in accordance with aspects of the present disclosure. In some examples, the hot cathode assembly illustrated in FIG. 5A can correspond to hot cathode assembly 400 and can include hot cathode 401, mounting sleeve 402, thermal shielding sleeve 404, base member 406, mounting flange 408A, electrical leg 410A, and electrical leg 410B. In some aspects, mounting flange 408A can be coupled to $V_{HC}$ electrode 502 (e.g., electrode that supplies bias voltage to hot cathode 401). In some cases, electrical leg 410B can be coupled to another electrode (not illustrated) that provides grounding to hot cathode 401. In some cases, hot cathode 401 may share a common ground electrode with a gas reservoir (as illustrated in FIG. 6B).

In some configurations, $V_{HC}$ electrode 502 can include a centralizing curb 508 that can be used to center or otherwise position the hot cathode assembly. For example, mounting flange 408A may abut centralizing curb 508 to position the hot cathode assembly within the tube.

In some cases, $V_{HC}$ electrode may also include vacuum through-holes 512 for vacuum connectivity.

In some aspects, a portion of the body of hot cathode 401 may extend past the $V_{HC}$ electrode 502. That is, as noted with respect to hot cathode assembly 400, mounting flange 408A can be coupled to an intermediate portion of thermal shielding sleeve 404 such that the end of hot cathode 401 is a distance d 506A from the $V_G$ electrode 504. In some cases, the $V_G$ electrode 504 may be aligned with a first grid (e.g., first grid 306) that is associated with a source cylinder.

In some examples, $V_{HC}$ electrode 502 may include an e-field shaping structure 510 that shapes the electrical field in the gap between the $V_{HC}$ electrode 502 and the $V_G$ electrode 504. In some aspects, the portion of thermal shielding sleeve 404 that extends past $V_{HC}$ electrode 502 may also be configured to operate as an e-field shaping structure.

Figure 5B:
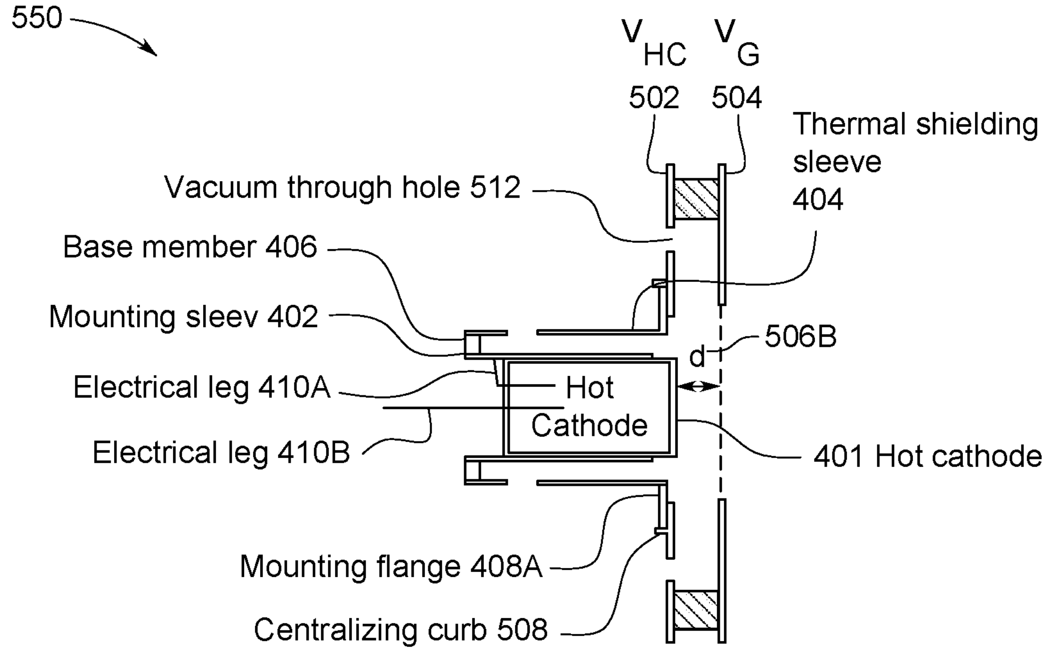
FIG. 5B is another diagram of a hot cathode assembly configured within an ion source, in accordance with aspects of the present disclosure.

FIG. 5B is a diagram of a system 550 that includes a hot cathode assembly 450 configured within an ion source, in accordance with aspects of the present disclosure. In some examples, the hot cathode assembly illustrated in FIG. 5B can correspond to hot cathode assembly 450 and can include hot cathode 401, mounting sleeve 402, thermal shielding sleeve 404, base member 406, mounting flange 408B, electrical leg 410A, and electrical leg 410B. In some aspects, mounting flange 408B can be coupled to $V_{HC}$ electrode 502 (e.g., electrode that supplies bias voltage to hot cathode 401). In some cases, electrical leg 410B can be coupled to another electrode (not illustrated) that provides grounding to hot cathode 401. In some cases, hot cathode 401 may share a common ground electrode with a gas reservoir (as illustrated in FIG. 6B).

As noted with respect to FIG. 5A, $V_{HC}$ electrode 502 can include a centralizing curb 508 that can be used to center or otherwise position the hot cathode assembly. For example, mounting flange 408B may abut centralizing curb 508 to position the hot cathode assembly within the tube.

In some aspects, the end of hot cathode 401 may be aligned with the $V_{HC}$ electrode 502. That is, as noted with respect to hot cathode assembly 450, mounting flange 408B can be coupled to an end portion of thermal shielding sleeve 404 such that the end of hot cathode 401 is substantially aligned with $V_{HC}$ electrode (e.g., a distance d 506B from the $V_G$ electrode 504).

Figure 6A:
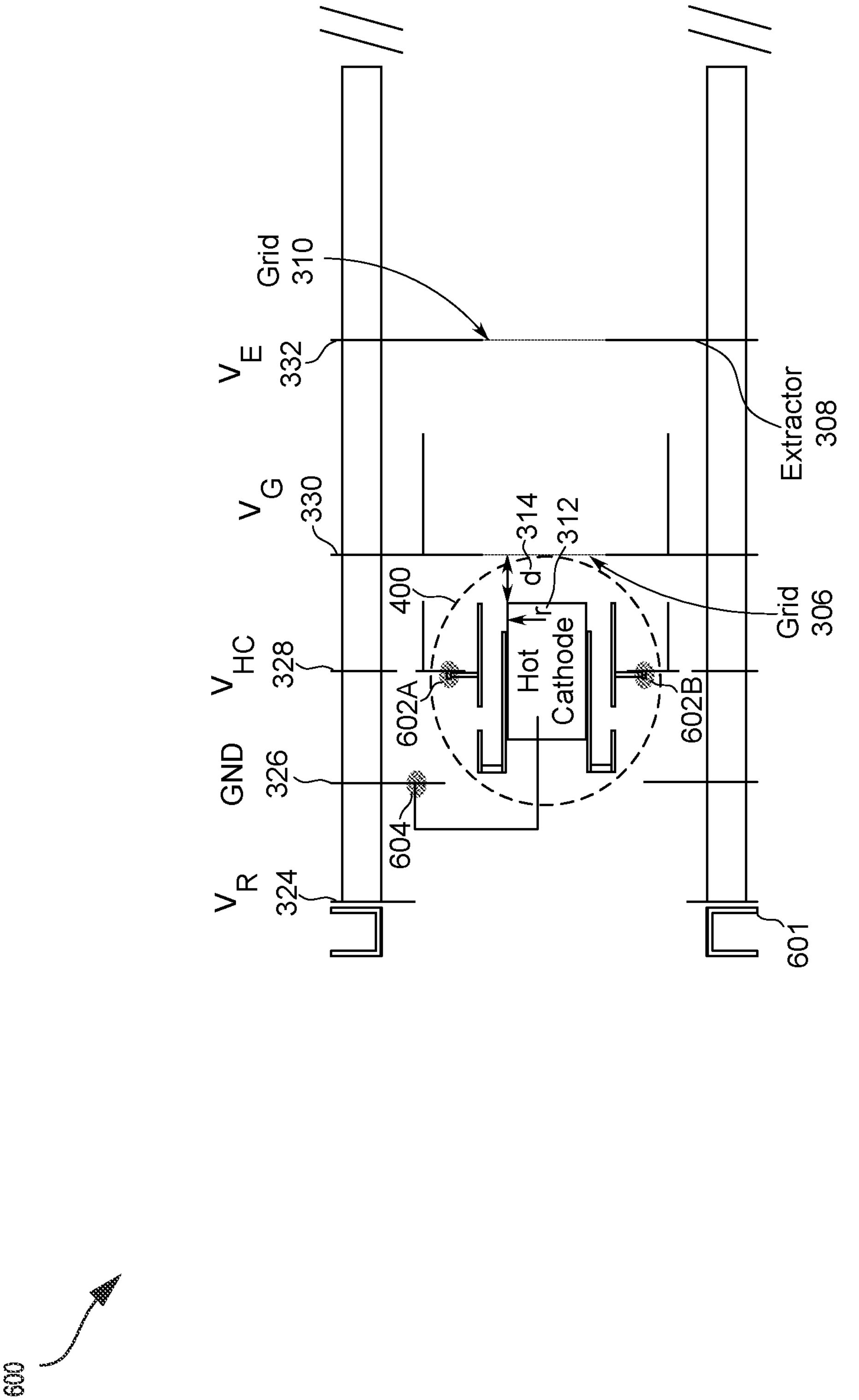
FIG. 6A is a diagram illustrating construction of a neutron generator that includes a hot cathode assembly, in accordance with aspects of the present disclosure.
Figure 6B:
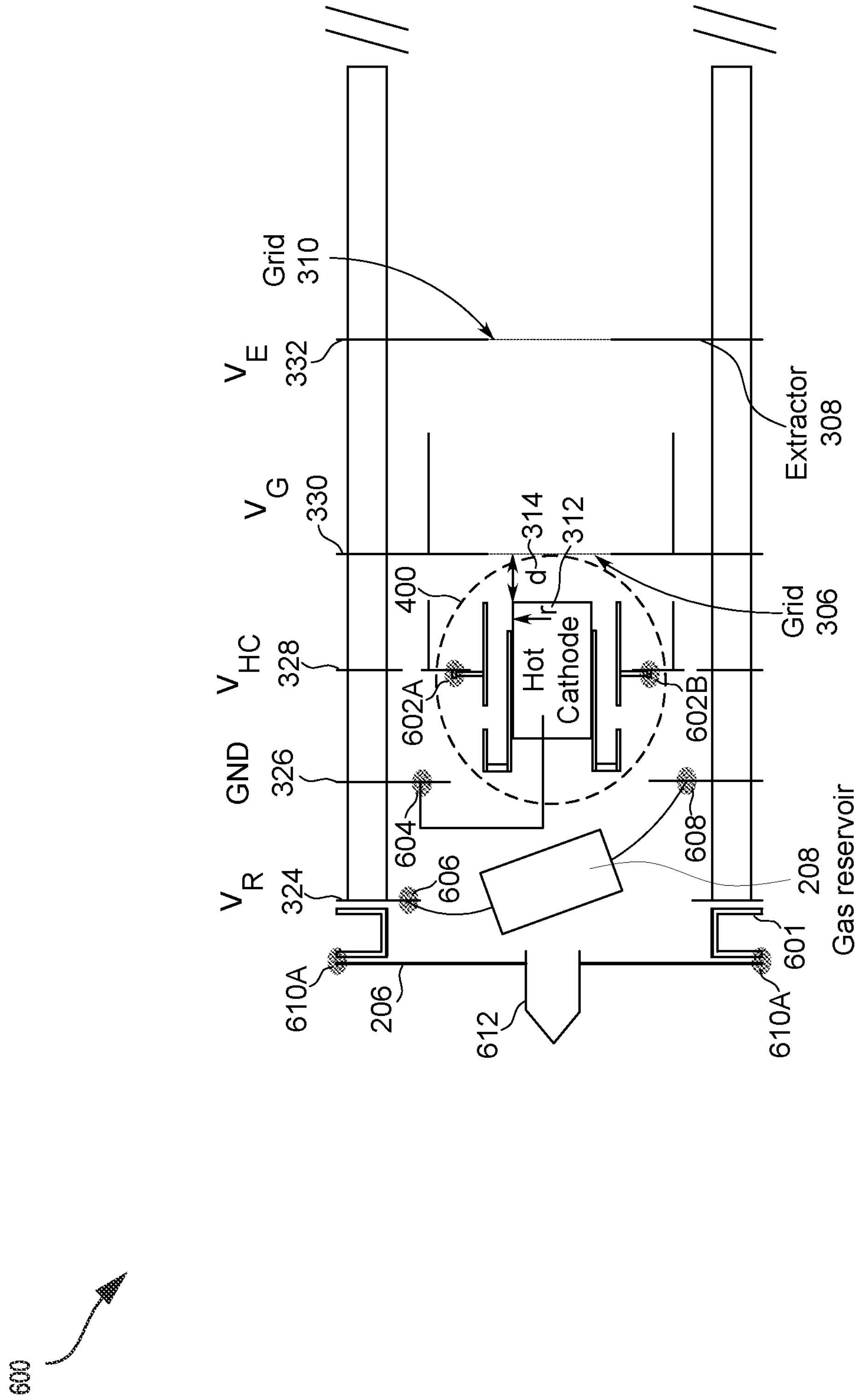
FIG. 6B is another diagram illustrating construction of a neutron generator that includes a hot cathode assembly, in accordance with aspects of the present disclosure.

FIG. 6A is a diagram illustrating construction of a neutron generator 600 that includes a hot cathode assembly 400. Note that FIG. 6A only illustrates the ion source side of the neutron generator 600 for simplicity (e.g., the suppressor and target are not illustrated). In some aspects, a first step for construction of neutron generator 600 may include brazing together the vacuum envelope of the tube, which may include ceramic spacers and electrodes (e.g., electrodes corresponding to $V_R$ 324, GND 326, $V_{HC}$ 328, $V_G$ 330, and $V_E$ 332). In some aspects, neutron generator 600 may also include welding lip 601 that can be used for sealing the vacuum tube (e.g., with an end-cap 206).

In some examples, after the tube is brazed, construction may proceed by installing hot cathode assembly 400 into the tube of neutron generator 600. In some aspects, hot cathode assembly 400 may be installed by coupling (e.g., welding, soldering, attaching) one or more components from hot cathode assembly 400 to electrodes of the tube. For instance, connection 602A and connection 602B illustrate coupling of mounting flange 408A to an electrode corresponding to $V_{HC}$ 328, and connection 604 illustrates coupling of electrical leg 410A to an electrode corresponding to ground (e.g., GND 326). As noted with respect to FIG. 5A and FIG. 5B, the electrode corresponding to $V_{HC}$ 328 may include a centralizing curb 508 that may abut mounting flange 408A. Installation of hot cathode assembly 400 may be configured in accordance with a desired distance d 314 and/or in accordance with the dimensions of hot cathode 401 (e.g., according to radius r 312).

FIG. 6B is a diagram illustrating further steps for construction of a neutron generator 600 that includes a hot cathode assembly 400. As noted with respect to FIG. 6A, FIG. 6B only illustrates the ion source side of the neutron generator 600 for simplicity. In some aspects, after hot cathode assembly 400 is installed, construction of neutron generator 600 may proceed by installing gas reservoir 208. For example, connection 606 illustrates coupling of gas reservoir to an electrode corresponding to $V_R$ 324 and connection 608 illustrates coupling of gas reservoir to an electrode corresponding to ground (e.g., GND 326). In some cases, gas reservoir 208 may be installed from the opening of vacuum tube envelope on the left side (e.g., prior to sealing the tube with end cap 206).

In some cases, after gas reservoir 208 is installed, construction of neutron generator 600 may proceed by installing (e.g., welding) an end cap 206 to seal the opening of vacuum tube envelope on the left side. For example, connection 610A and connection 610B illustrate coupling of the end cap 206 to the welding lip 601. In some cases, the end cap 206 can have a tubing connection 612 to a vacuum pumping and gas handling system that can be used for processing before being pinched-off. In some aspects, construction of neutron generator 600 may include connecting (e.g., welding) the target (not illustrated) to seal the other end of the neutron tube.

Figure 7:
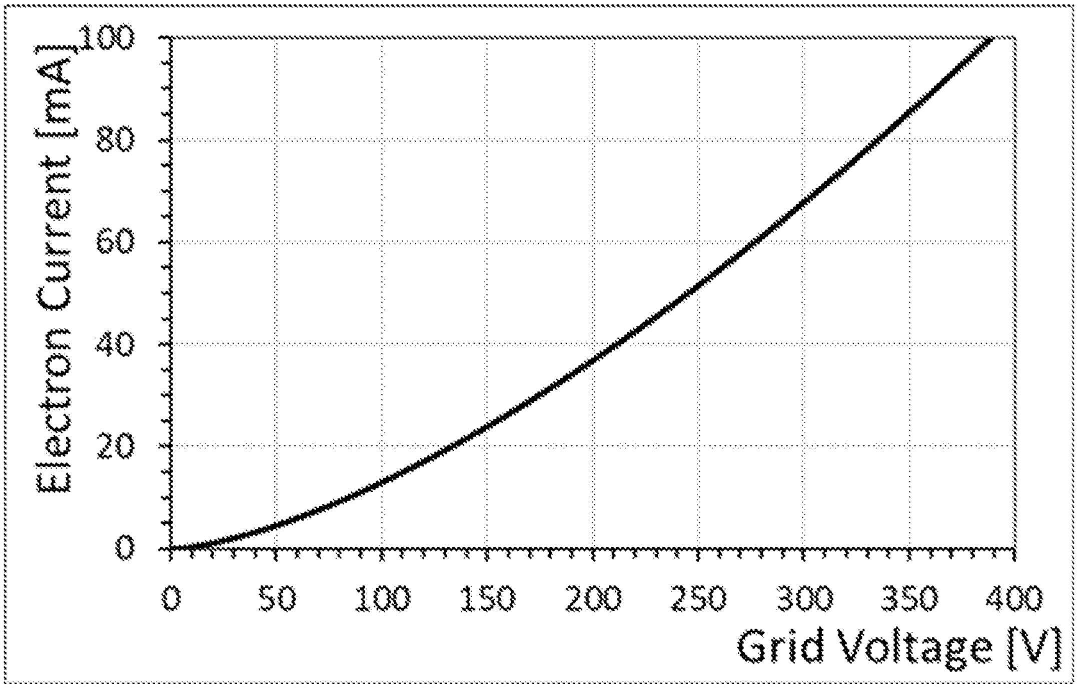
FIG. 7 is a graph illustrating electron emission current as a function of grid voltage for a hot cathode of a neutron generator, in accordance with aspects of the present disclosure.

FIG. 7 is a graph of electron emission current as a function of grid voltage for a hot cathode of a neutron generator according to one example of the present disclosure. The chart shows electron emission current ($I_e$) as a function of the voltage of the first grid 306 voltage (voltage of the first grid 306 minus the voltage of the hot cathode 302) for a hot cathode 302 with a radius of 2 mm and positioned at 1.5 mm next to the first grid 306, according to one example of the disclosure. With such a geometry, and the suitable hot cathode 302, an electron current of 40-50 mA can be achieved when applying a voltage to the first grid 306 in a range of 200-250 V. Such a hot cathode can involve a few watts of heating power, and it can provide an operational lifetime beyond 10,000 hours. According to the voltage dependence of the Child Law, the higher the grid voltage is, the higher the electron emission current provided that sufficient space charge is available on the cathode surface due to heating. Therefore, with a separated grid, this can be optimized in the ion source by adjusting the voltage of the first grid higher, close to 250 V.

Figure 8:
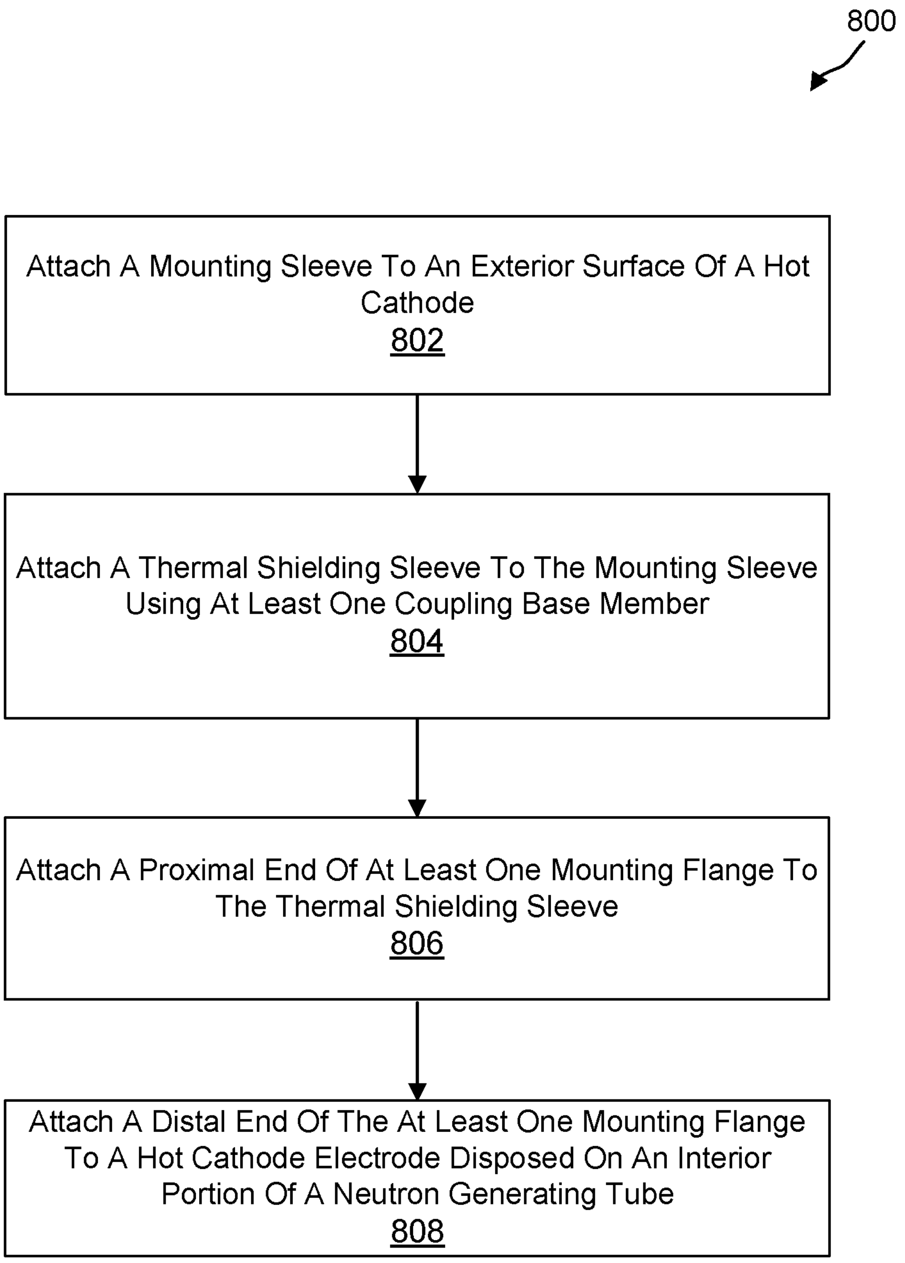
FIG. 8 is a flowchart diagram of a process for constructing a neutron generator, in accordance with aspects of the present disclosure.

FIG. 8 illustrates an example of a process 800 for constructing a neutron generator, in accordance with aspects of the present disclosure. At block 802, the process 800 includes attaching a mounting sleeve to an exterior surface of a hot cathode. For example, mounting sleeve 402 can be attached to an exterior surface of hot cathode 401.

At block 804, the process 800 includes attaching a thermal shielding sleeve to the mounting sleeve using at least one coupling base member, wherein the thermal shielding sleeve has a larger diameter than the mounting sleeve. For instance, thermal shielding sleeve 404 can be attached to mounting sleeve 402 using base member 406.

At block 806, the process 800 includes attaching a proximal end of at least one mounting flange to the thermal shielding sleeve. For example, a first end of mounting flange 408A can be attached to thermal shielding sleeve 404.

At block 808, the process 800 includes attaching a distal end of the at least one mounting flange to a hot cathode electrode disposed on an interior portion of a neutron generating tube. For instance, a second end of mounting flange 408A can be attached to $V_{HC}$ electrode 502.

In some cases, the hot cathode electrode includes at least one centralizing curb member, and wherein the at least one centralizing curb member abuts to the distal end of the at least one mounting flange. For example, $V_{HC}$ electrode 502 can include centralizing curb 508, which can abut the distal end of mounting flange 408A.

In some examples, the proximal end of the at least one mounting flange is attached to an intermediate portion of the thermal shielding sleeve. For instance, the proximal end of mounting flange 408A can be attached to an intermediate portion (e.g., an intermediate position) of thermal shielding sleeve 404. In some aspects, the hot cathode electrode includes at least one field shaping member that extends in a direction orthogonal to the at least one mounting flange. For example, $V_{HC}$ electrode 502 can include e-field shaping structure 510 that extends in a direction orthogonal to mounting flange 408A.

In some cases, the proximal end of the at least one mounting flange is attached to an edge portion of the thermal shielding sleeve. For example, the proximal end of mounting flange 408B can be attached to an edge portion (e.g., end) of thermal shielding sleeve 404. In some instances, the mounting sleeve and the thermal shielding sleeve can comprise a molybdenum-rhenium (MoRe) material.

In some examples, the process 800 can include brazing the stack of a vacuum envelope, which may include ceramic rings and electrodes. For example, brazing the stack of the vacuum envelope corresponding to neutron generator 200. In some cases, the process 800 can include installing (e.g., welding, attaching, etc.) the hot cathode assembly in a neutron generator (e.g., matching flange positions, making electrical connections to electrodes 224, etc.). For example, mounting flange 408A can be welded to $V_{HC}$ electrode 502. In some instances, the process 800 can include installing the gas reservoir. For example, gas reservoir 208 can be installed (e.g., connected to electrodes) within neutron generator 200. In some configurations, the process 800 can include welding the end cap 206 to the welding lip 601 to seal an end of the neutron tube, and the end cap 206 may include a tubing connection 612 to a vacuum pumping and filling system before being pinched-off. In some configurations, the process 800 can include installing (e.g., welding) the target to seal the opposite end of the neutron tube.

Figure 9:
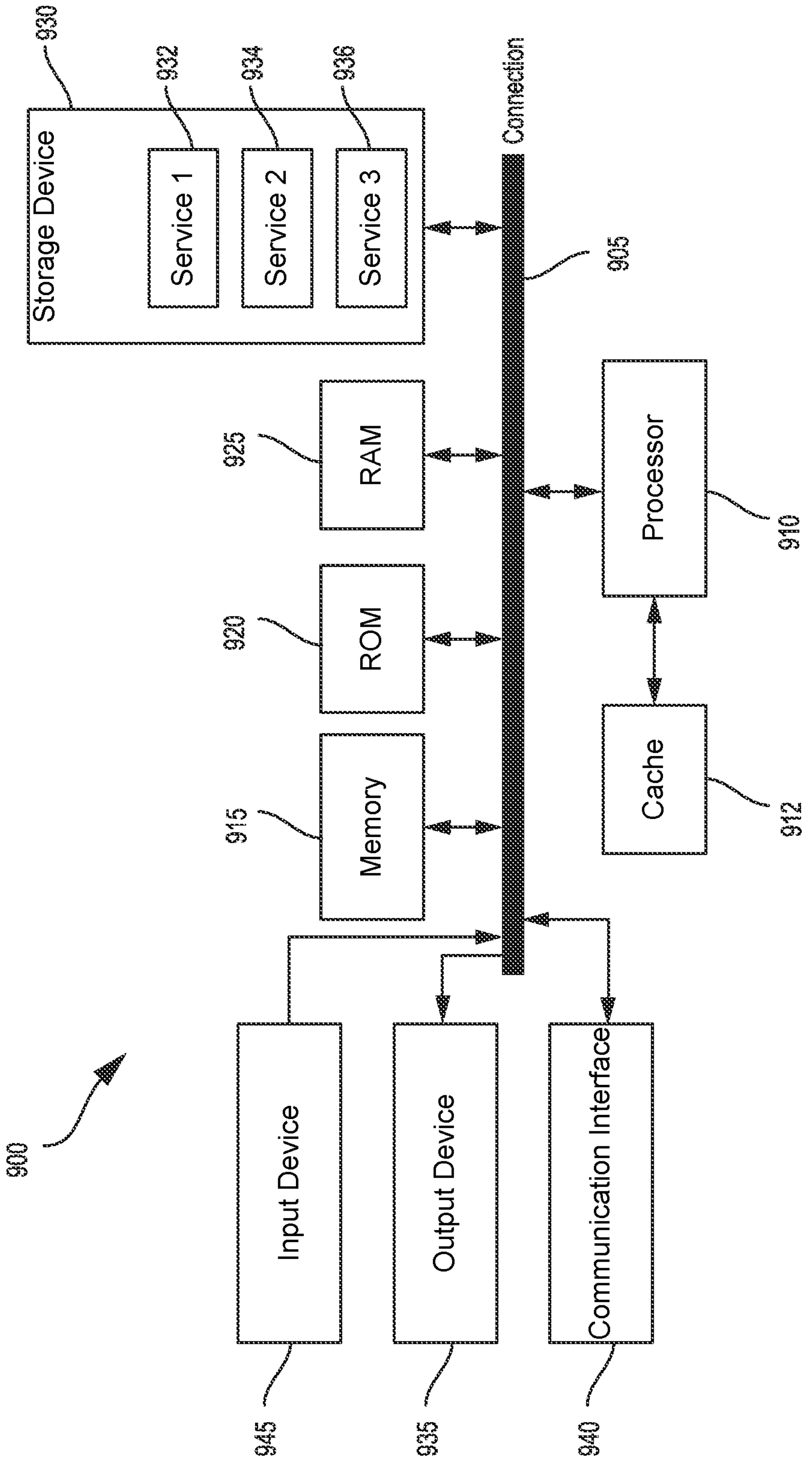
FIG. 9 is a block diagram illustrating an example computing device architecture, in accordance with aspects of the present disclosure.

FIG. 9 illustrates an example computing device architecture 900 which can be employed to perform various steps, methods, and techniques disclosed herein. Specifically, the techniques described herein can be implemented, at least in part, through the computing device architecture 900 in an applicable computing device, such computing device 126 and/or downhole tool 118. The various implementations will be apparent to those of ordinary skill in the art when practicing the present technology. Persons of ordinary skill in the art will also readily appreciate that other system implementations or examples are possible.

As noted above, FIG. 9 illustrates an example computing device architecture 900 of a computing device which can implement the various technologies and techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A neutron generator comprising: an ion source for generating neutrons for neutron logging downhole in a wellbore, wherein the ion source includes: a hot cathode; at least one cylindrical sleeve coupled to an exterior surface of the hot cathode; at least one electrode coupled to an interior surface of the neutron generator; and at least one mounting flange, wherein a proximal end of the at least one mounting flange is coupled to the at least one cylindrical sleeve and a distal end of the at least one mounting flange is coupled to the at least one electrode.

Statement 2. The neutron generator of statement 1, wherein the at least one cylindrical sleeve comprises a first cylindrical sleeve and a second cylindrical sleeve that is concentric to the first cylindrical sleeve, wherein the first cylindrical sleeve is coupled to the exterior surface of the hot cathode and the second cylindrical sleeve is coupled to the proximal end of the at least one mounting flange.

Statement 3. The neutron generator of statement 2, further comprising: a base member having a first end that is coupled to the first cylindrical sleeve and a second end that is coupled to the second cylindrical sleeve.

Statement 4. The neutron generator of any of statements 1 to 3, further comprising: at least one centralizing curb member protruding from the at least one electrode, wherein the at least one centralizing curb member abuts to the distal end of the at least one mounting flange.

Statement 5. The neutron generator of any of statements 1 to 4, wherein the proximal end of the at least one mounting flange is coupled to an intermediate portion of the at least one cylindrical sleeve, wherein a portion of the hot cathode extends past the at least one electrode.

Statement 6. The neutron generator of any of statements 1 to 4, wherein the proximal end of the at least one mounting flange is coupled to an edge portion of the at least one cylindrical sleeve, wherein an end of the hot cathode is aligned with the at least one electrode.

Statement 7. The neutron generator of any of statements 1 to 6, wherein the at least one electrode corresponds to a hot cathode biasing voltage.

Statement 8. A hot cathode apparatus comprising: a hot cathode; at least one cylindrical sleeve coupled to an exterior surface of the hot cathode; and at least one mounting flange, wherein a proximal end of the at least one mounting flange is coupled to the at least one cylindrical sleeve and a distal end of the at least one mounting flange is configured for attaching to at least one electrode for providing a bias voltage to the hot cathode.

Statement 9. The hot cathode apparatus of statement 8, wherein the at least one cylindrical sleeve comprises a first cylindrical sleeve and a second cylindrical sleeve that is concentric to the first cylindrical sleeve, wherein the first cylindrical sleeve is coupled to the exterior surface of the hot cathode and the second cylindrical sleeve is coupled to the proximal end of the at least one mounting flange.

Statement 10. The hot cathode apparatus of statement 9, further comprising: a base member having a first end that is coupled to the first cylindrical sleeve and a second end that is coupled to the second cylindrical sleeve.

Statement 11. The hot cathode apparatus of any of statements 9 to 10, wherein the second cylindrical sleeve includes a plurality of apertures for vacuum connectivity.

Statement 12. The hot cathode apparatus of any of statements 8 to 11, wherein the at least one cylindrical sleeve comprises a molybdenum-rhenium (MoRe) material.

Statement 13. The hot cathode apparatus of any of statements 8 to 12, wherein the proximal end of the at least one mounting flange is coupled to an intermediate portion of the at least one cylindrical sleeve.

Statement 14. The hot cathode apparatus of any of statements 8 to 12, wherein the proximal end of the at least one mounting flange is coupled to an edge portion of the at least one cylindrical sleeve.

Statement 15. A method for constructing a neutron generator, the method comprising: attaching a mounting sleeve to an exterior surface of a hot cathode; attaching a thermal shielding sleeve to the mounting sleeve using at least one coupling base member, wherein the thermal shielding sleeve has a larger diameter than the mounting sleeve; attaching a proximal end of at least one mounting flange to the thermal shielding sleeve; and attaching a distal end of the at least one mounting flange to a hot cathode electrode disposed on an interior portion of a neutron generating tube.

Statement 16. The method of statement 15, wherein the hot cathode electrode includes at least one centralizing curb member, and wherein the at least one centralizing curb member abuts to the distal end of the at least one mounting flange.

Statement 17. The method of any of statements 15 to 16, wherein the proximal end of the at least one mounting flange is attached to an intermediate portion of the thermal shielding sleeve.

Statement 18. The method of statement 17, wherein the hot cathode electrode includes at least one field shaping member that extends in a direction orthogonal to the at least one mounting flange.

Statement 19. The method of any of statements 15 to 16, wherein the proximal end of the at least one mounting flange is attached to an edge portion of the thermal shielding sleeve.

Statement 20. The method of any of statements 15 to 19, wherein the mounting sleeve and the thermal shielding sleeve comprise a molybdenum-rhenium (MoRe) material.

Statement 21. An apparatus comprising at least one memory; and at least one processor coupled to the at least one memory, wherein the at least one processor is configured to perform operations in accordance with any one of statements 15 to 19.

Statement 22: An apparatus comprising means for performing operations in accordance with any one of statements 15 to 19.

Statement 23: A non-transitory computer-readable medium comprising instructions that, when executed by an apparatus, cause the apparatus to perform operations in accordance with any one of statements 15 to 19.

Statement 24. A method comprising: deploying a logging tool having a neutron generator into a wellbore, the neutron generator comprising an ion source that includes: a hot cathode, at least one cylindrical sleeve coupled to an exterior surface of the hot cathode, at least one electrode coupled to an interior surface of the neutron generator, and at least one mounting flange, wherein a proximal end of the at least one mounting flange is coupled to the at least one cylindrical sleeve and a distal end of the at least one mounting flange is coupled to the at least one electrode; ionizing an ionizable gas within the ion source to create a plurality of ions; accelerating the plurality of ions toward a target to yield a plurality of neutrons; transmitting the plurality of neutrons from the neutron generator into a formation surrounding the wellbore; and receiving a signal measurement related to the plurality of neutrons at one or more sensors in the logging tool.

Statement 25. An apparatus comprising at least one memory; and at least one processor coupled to the at least one memory, wherein the at least one processor is configured to perform operations in accordance with statement 24.

Statement 26: An apparatus comprising means for performing operations in accordance with statement 24.

Statement 27: A non-transitory computer-readable medium comprising instructions that, when executed by an apparatus, cause the apparatus to perform operations in accordance with statement 24.

What is claimed is:

1. A neutron generator comprising:
- an ion source for generating neutrons for neutron logging downhole in a wellbore, wherein the ion source includes:
  - a hot cathode;
  - at least one cylindrical sleeve coupled to an exterior surface of the hot cathode;
  - at least one electrode coupled to an interior surface of the neutron generator; and
  - at least one mounting flange, wherein a proximal end of the at least one mounting flange is coupled to the at least one cylindrical sleeve and a distal end of the at least one mounting flange is coupled to the at least one electrode, further wherein the at least one cylindrical sleeve comprises a first cylindrical sleeve and a second cylindrical sleeve that is concentric to the first cylindrical sleeve, wherein the first cylindrical sleeve is coupled to the exterior surface of the hot cathode and the second cylindrical sleeve is coupled to the proximal end of the at least one mounting flange.

2. The neutron generator of claim 1, further comprising:
- a base member having a first end that is coupled to the first cylindrical sleeve and a second end that is coupled to the second cylindrical sleeve.

3. The neutron generator of claim 1, further comprising:
- at least one centralizing curb member protruding from the at least one electrode, wherein the at least one centralizing curb member abuts to the distal end of the at least one mounting flange.

4. The neutron generator of claim 1, wherein the proximal end of the at least one mounting flange is coupled to an intermediate portion of the at least one cylindrical sleeve, wherein a portion of the hot cathode extends past the at least one electrode.

5. The neutron generator of claim 1, wherein the proximal end of the at least one mounting flange is coupled to an edge portion of the at least one cylindrical sleeve, wherein an end of the hot cathode is aligned with the at least one electrode.

6. The neutron generator of claim 1, wherein the at least one electrode corresponds to a hot cathode biasing voltage.

7. A hot cathode apparatus comprising:
- a hot cathode;
- at least one cylindrical sleeve coupled to an exterior surface of the hot cathode; and
- at least one mounting flange, wherein a proximal end of the at least one mounting flange is coupled to the at least one cylindrical sleeve and a distal end of the at least one mounting flange is configured for attaching to at least one electrode for providing a bias voltage to the hot cathode, further wherein the at least one cylindrical sleeve comprises a first cylindrical sleeve and a second cylindrical sleeve that is concentric to the first cylindrical sleeve, wherein the first cylindrical sleeve is coupled to the exterior surface of the hot cathode and the second cylindrical sleeve is coupled to the proximal end of the at least one mounting flange.

8. The hot cathode apparatus of claim 7, further comprising:
- a base member having a first end that is coupled to the first cylindrical sleeve and a second end that is coupled to the second cylindrical sleeve.

9. The hot cathode apparatus of claim 7, wherein the second cylindrical sleeve includes a plurality of apertures for vacuum connectivity.

10. The hot cathode apparatus of claim 7, wherein the at least one cylindrical sleeve comprises a molybdenum-rhenium (MoRe) material.

11. The hot cathode apparatus of claim 7, wherein the proximal end of the at least one mounting flange is coupled to an intermediate portion of the at least one cylindrical sleeve.

12. The hot cathode apparatus of claim 7, wherein the proximal end of the at least one mounting flange is coupled to an edge portion of the at least one cylindrical sleeve.

13. A method for constructing a neutron generator, the method comprising:
- attaching a mounting sleeve to an exterior surface of a hot cathode;

attaching a thermal shielding sleeve to the mounting sleeve using at least one coupling base member, wherein the thermal shielding sleeve has a larger diameter than the mounting sleeve;

attaching a proximal end of at least one mounting flange to the thermal shielding sleeve; and attaching a distal end of the at least one mounting flange to a hot cathode electrode disposed on an interior portion of a neutron generating tube.

14. The method of claim 13, wherein the hot cathode electrode includes at least one centralizing curb member, and wherein the at least one centralizing curb member abuts to the distal end of the at least one mounting flange.

15. The method of claim 13, wherein the proximal end of the at least one mounting flange is attached to an intermediate portion of the thermal shielding sleeve.

16. The method of claim 15, wherein the hot cathode electrode includes at least one field shaping member that extends in a direction orthogonal to the at least one mounting flange.

17. The method of claim 13, wherein the proximal end of the at least one mounting flange is attached to an edge portion of the thermal shielding sleeve.

18. The method of claim 13, wherein the mounting sleeve and the thermal shielding sleeve comprise a molybdenum-rhenium (MoRe) material.

* * * * *